United States Patent

[11] 3,584,883

[72] Inventor Friedel Horstmann
Espelkamp-Mittwald, Germany
[21] Appl. No. 762,805
[22] Filed Sept. 26, 1968
[45] Patented June 15, 1971
[73] Assignee Wilhelm Harting Werk fur Elektrotechnik und Mechanik
Espelkamp-Mittwald, Germany
[32] Priority Oct. 2, 1967
[33] Germany
[31] P 15 72 447.7

[54] RECORD PLAYER FOR PLAYING A SELECTED SIDE OF A DISC RECORD
10 Claims, 6 Drawing Figs.

[52] U.S. Cl. 274/10
[51] Int. Cl. G11b 17/22, G11b 17/06
[50] Field of Search 274/10.1, 10 R, 23

[56] References Cited

UNITED STATES PATENTS

| | | | |
|---|---|---|---|
| 2,550,794 | 5/1951 | Fisher | 274/10 |
| 2,570,040 | 10/1951 | Thorens et al. | 274/10 |

*Primary Examiner*—Leonard Forman
*Assistant Examiner*—Steven L. Stephan
*Attorney*—Arthur O. Klein

ABSTRACT: A record player for playing a selected side of a disc record. The disc record is in a vertical plane and rotates about a horizontal axis during the playing thereof, and a tone arm means initially has its axis coinciding with the plane subsequently occupied by the disc record. A bearing means supports the tone arm means for swinging moment about a vertical axis as well as about a horizontal axis, and a carriage means supports the bearing means for movement along this horizontal axis. A rotary cam means has a central plane of symmetry which coincides with the plane of the disc record during the playing thereof, and a cam follower means is carried by the carriage means. A yieldable positioning means locates the carriage means and the tone arm means at an initial position where the axis of the tone arm means coincides with the plane occupied by the disc record during the playing thereof, and the cam means coacts with the cam follower means for displacing the carriage means and tone arm means to a selected side of the plane occupied by the record during the playing thereof so that the tone arm means will be positioned for engaging a selected side of the record. A selecting means coacts with the cam follower means for situating the latter at a selected side of the plane of symmetry of the rotary cam means, so that in this way the latter will coact with the carriage means and tone arm means for positioning the latter to engage the selected side of the record.

PATENTED JUN 15 1971 3,584,883

SHEET 1 OF 3

Jnventor:
Friedel HORSTMANN
by: Arthur O. Klein
his Attorney

Jnventor:
Friedel HORSTMANN
by: Arthur O. Klein
his Attorney

Jnventor:
Friedel HORSTMANN
by: Arthur O. Klein
his Attorney

RECORD PLAYER FOR PLAYING A SELECTED SIDE OF A DISC RECORD

BACKGROUND OF THE INVENTION

The present invention relates to record players.

In particular, the present invention relates to that type of record player where a disc record is supported for rotary movement on a vertical turntable so that the record rotates about a horizontal axis. The turntable engages, in a known way, only the ungrooved central portion of the record, so that the opposed grooved sides thereof are accessible to needle assemblies of a tone arm. The record can be rotated in one direction or the other depending upon which side is being played, and the tone arm carries a pair of opposed needle assemblies for respectively coacting with the opposed sides of the record.

The operator can select which side of the record is to be played, and in accordance with this selection the tone arm is positioned to coact with the selected record side.

With conventional structures of the above general type, it is required that the tone arm be placed in the shortest possible time gently and smoothly in engagement with the selected side of the disc record which is to be played, so that one or the other of the needle assemblies will enter into the grooves of the selected side. After the playing of the record has been completed, it is required that the tone arm automatically return to its starting position. The forces required to bring about the desired movements of the tone arm are derived from special driving components of the record changer, during intervals between record-playing cycles, these driving components rotating suitably shaped control cams with which the tone arm or its bearing are operatively connected.

It is known, in order to fulfill these requirements, to make use of the direction of movement which takes place between the playing unit and the magazine for the disc records, inasmuch as the tone arm is actuated in response to operation of a suitable end reversing switch to move in one direction for engaging only a selected front side of the record and in the other direction for engaging only the selected rear side of the record. This known arrangement, however, has certain disadvantages in that the disc record cannot be directly played at both of its sides and in that between playing the opposite sides of the record, which go together, there will be the playing of subsequently selected records.

Another type of known control for the tone arm eliminates these latter disadvantages, but requires reversal of a driving motor to provide a selected one of opposed directions of rotation of a cam which controls the tone arm, depending upon the direction of movement of the record magazine during selection of a record or depending upon the direction of movement of the playing unit, in order to place the tone arm either into engagement with the selected front side or the selected rear side of the record. This type of construction operates with an exceedingly expensive and complex control structure.

There are also known tone arm controls which eliminate the disadvantage of requiring a reversal in the direction of rotation of the control cam, but in this case double camming surfaces of a control cam must have a relatively complex configuration to achieve the required movement from the pair of camming surfaces, so that a complex cam which is expensive to manufacture is essential. A further disadvantage is that this type of construction requires, as a result of the camming configurations, a relatively long time for changing the tone arm from one to the other side of the disc record. Thus, with such a cam, the camming groove, for example, which controls the tone arm so that it will engage one side of the disc record has practically no inclination, while the other camming groove which brings about engagement between the tone arm and the other side of the record requires a sharp inclination, with respect to the axis of the cam, and after one revolution of the cam the inclined, steep camming groove thereof must communicate with the camming groove which is without any substantial inclination, so that the control can be switched between these cam grooves. Thus, a cam follower pin which coacts with the shiftable tone arm bearing is guided in the selected one of these grooves, and in accordance with the position of a releasable lock mechanism, the tone arm bearing is shifted toward the sharply inclined camming groove by a spring, so that by controlling the releasable lock mechanism the follower pin can be selectively placed in a position to coact either with the simple circular camming groove which is situated substantially in a plane normal to the axis of rotation of the cam or, after excitation of an electromagnet or the like to release the lock, the follower pin can be displaced by the action of a spring to coact with the sharply inclined camming groove.

U.S. Pat. No. 3,380,742 discloses a record player of the general type to which the present invention relates, and this patent also shows this latter type of cam structure for controlling the tone arm.

SUMMARY OF THE INVENTION

It is accordingly a primary object of the present invention to provide a construction which will avoid all of the above disadvantages in the known controls for the tone arm of an automatic record changer.

In addition, it is an object of the invention to provide a construction which will greatly reduce the time required for placing the tone arm in engagement with the side of the record which is to be played as well as for changing the tone arm over from one side to the other side of the record.

Furthermore, it is an object of the present invention to provide a construction which enables the camming structure itself to be considerably simplified, as compared to conventional cam structures.

In particular, it is an object of the invention to provide a construction which can make use of a control cam which need not be machined and which is capable of reducing the control path of movement from one side to the other side of the record by one half, so that the time required for displacing the tone arm from one side to the other side of the record can be reduced by half.

Thus, it is an object of the invention to provide a construction which will enable a selected record to be displaced from a magazine to the turntable in a more rapid manner than has heretofore been possible.

Also, it is an object of the invention to provide a construction which will utilize simple components in order to displace the tone arm to and from the record.

The invention is used with that type of record player where the record rotates about a horizontal axis and is located in a vertical plane during playing of the record. An elongated tone arm means has a pair of needle assemblies for respectively coacting with opposed sides of the record. A bearing means carries the tone arm means to support the latter for swinging movement about a vertical axis as well as about a horizontal axis which extends parallel to the axis of rotation of the record. A carriage means carries the bearing means to support the latter for movement along its horizontal axis, and a yieldable positioning means coacts with the carriage means and tone arm means for initially positioning them, between record playing cycles, at a location where the axis of the tone arm is situated in the plane which is occupied by the record during the playing thereof. A cam follower means is carried by the carriage means and coacts with a rotary cam means which has a central plane of symmetry coinciding with the plane occupied by the record during the playing thereof, this rotary cam means being perfectly symmetrical on opposite sides of its plane of symmetry. A selecting means coacts with the cam follower means to situate the latter at a selected side of the central plane of symmetry of the rotary cam means, so that a camming surface at a selected side of the central plane of the rotary cam means will coact with the cam follower means to act on the carriage means and thus on the tone arm means to displace them in opposition to the yieldable positioning means in a manner which will situate the tone arm in operative engagement with the selected side of the record.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
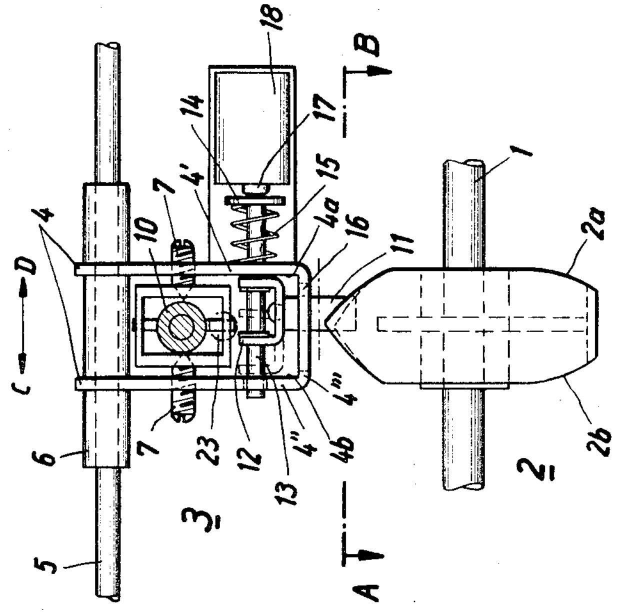
FIG. 1 is a schematic fragmentary elevation illustrating the rotary cam means of the invention together with the carriage means and the tone arm which is shown in transverse section in FIG. 1 in an initial position between record playing cycles.

Referring now to FIG. 1, there is fragmentarily illustrated therein a rotary camshaft 1 which turns in only one direction in between record-playing cycles when a given record is selected to be played. The camshaft 1 fixedly carries a rotary cam means 2 of the invention. Over the camshaft 1 and the rotary cam means 2 there is the carriage means 3 which primarily consists of a U-shaped plate member 4 having opposed parallel vertical sidewalls 4' and 4'' and having a bottom wall 4''' interconnecting the vertical walls of the U-shaped member 4 of the carriage means 3. The carriage means further includes a pair of tubes 6 (FIGS. 3 and 5) extending through and fixed to the sidewalls of the member 4 and receiving stationary guide rods 5 which extend slidably through the tubes 6, so that the carriage means 3 is shiftable along the stationary guide rods 5 which are parallel to each other. In this way the carriage means is horizontally shiftable in the directions indicated by the double-headed arrow C–D of FIG. 1.

The carriage means 3 carries a bearing means which supports the tone arm means 10. This bearing means includes a pair of pointed pins 7 adjustably mounted on the walls 4' and 4'', as by being threaded therethrough, and having their pointed tips received in conical recesses formed in opposed sidewalls of a bearing member 8 which is of substantially rectangular configuration, as indicated in FIG. 1. Thus, the bearing member 8 is swingable about the horizontal axis defined by the pair of coaxial pins 7, and the bearing member 8 itself carries a vertical pin 9 about which the tone arm means 10 is swingable, so that in this way the bearing means serves to support the tone arm means for swinging movement about a vertical axis as well as about a horizontal axis along which the carriage means is movable.

Beneath this bearing means, the carriage means 3 carries a cam follower means 11 which is shiftable with respect to the carriage means 3 horizontally in a direction parallel to the horizontal axis defined by the pins 7. This cam follower means 11 is in the form of a vertical cam follower carrying at its top end the U-shaped member 12 having vertical sidewalls formed with aligned openings through which a slide rod 13 extends. The slide rod 13 is fixed to the member 12 and itself extends slidably through coaxial openings formed in the sidewalls of the U-shaped member 4, so that the cam follower means 11 is horizontally shiftable in a direction parallel to the common axis of the pins 7.

As will be apparent from the description which follows, the rotary cam means 2 has a central plane of symmetry which contains the axis of the tone arm means 10 when the latter is in its initial position between record-playing cycles and which coincides with a plane in which a record 19 is located when it is played, and in accordance with the particular side of the record which is to be played, the follower means 11 will be situated on one side or the other of the central plane of symmetry of the rotary cam means 2.

The situation of the cam follower means 11 on one or the other side of the central plane of symmetry of the cam means 2 is brought about by a selecting means which includes a coil spring 15 coiled about the slide rod 13 and pressing at one end against the wall 4' and at its opposite end against a disc 14 fixed to the right end of the rod 13, as viewed in FIG. 1. In this way, the spring 15 will locate the member 12 of the cam follower means in engagement with the inner limiting surface 4a of the wall 4', and thus the cam follower means will be located on the right side of the central plane of symmetry of the rotary cam means 2, as viewed in FIG. 1.

The bottom wall 4''' of the member 4 of the carriage means 3 is formed with a longitudinal slot 16 through which the follower means 11 freely extends so that it is guided by the slot and free to move horizontally between the solid and dotted line positions indicated in FIG. 1 for the member 12. A bracket which is carried by the wall 4' carries an electromagnet 18 having an armature 17 which is shifted to the left, as viewed in FIG. 1, when the electromagnet is energized, and this armature will then shift the slide rod 13 to the left, as viewed in FIG. 1, in opposition to the spring 15, to locate the member 12 in engagement with the inner limiting surface 4b of the wall 4'', and in this way the cam follower means 11 will be located on the left side of the central plane of symmetry of the rotary cam means 2. Thus, this selecting means will enable the operator to selectively locate the cam follower means 11 on one side or the other side of the central plane of symmetry of the rotary cam means 2, so that in this way the particular side of the record which is to be played can be selected, as will be apparent from the description which follows.

Figure 2:
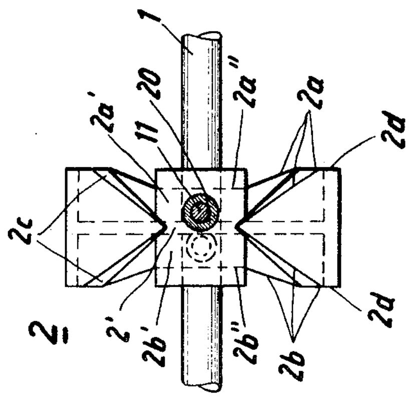
FIG. 2 is a top plan view of the rotary cam means of FIG. 1 shown in FIG. 2 with a cam follower means in the initial position of the parts.

When the parts are in their initial position indicated in FIGS. 1 and 2, with the electromagnet 18 unenergized, the cam follower means 11 will be situated on that side of the central plane of symmetry of the rotary cam means 2 which will provide coaction between the right camming surface 2a of the rotary cam means 2 and the cam follower means 11. Thus, the cam follower means 11 will initially be located at the entrance region 2a' of the right end camming surface of the disc-shaped cam 2. This coaction between the cam follower means 11 and the right camming surface 2a will bring about coaction between the tone arm means 10 and the right side of the record 19, so that the right side 19a thereof (FIGS. 3 and 5) will be played. Thus, maintaining the electromagnet 18 of the selecting means unenergized results in a selection of the right side 19a of the disc record 19.

On the other hand, if the left side 19b of the record is to be played, then while the parts are still stationary and in their initial position, the electromagnet 18 is energized through closing of a suitable circuit so that the armature of plunger 17 will now displace the slide rod 13 in opposition to the spring 15 to the position where the member 12 engages the inner limiting surface 4b of the wall 4'', and now the cam follower means 11 will move through the sector-shaped cutout of the cam means 2 so as to be situated on the other side of the central plane of symmetry of the cam means, and at this time the cam follower means will be at the entrance region 2b' of the opposed end camming surface 2b of the cam 2. The ring or disc-shaped cam means 2 is formed with a sector-shaped cutout 2' with which the follower means 11 is aligned in the initial position of the parts shown in FIGS. 1 and 2, so that when the selection is made the cam follower means 11 can freely shift to one side or the other of the central plane of symmetry of the rotary cam means.

The cam follower means 11 includes a freely rotatable sleeve 20 which directly engages one or the other of the camming surfaces to reduce the friction, and when the electromagnet 18 remains unenergized, the cam follower means 11 is acted upon by the right camming surface 2a so that the carriage means 3 is displaced toward the right for playing the right side 19a of the record 19. When the electromagnet 18 is energized the cam follower means 11 is acted upon by the left end camming surface 2b, so that now the carriage means 3 will be shifted toward the left preparatory to playing the left side 19b of the record 19.

In between record-playing cycles when the carriage means 3 and the tone arm means 10 are located at their initial positions indicated in FIGS. 1—4, the axis of the tone arm 10 is situated in the plane subsequently occupied by the record 19 during playing of the latter, and at this time the axis of the tone arm means 10 also extends centrally between the sidewalls of the U-shaped member 4 of the carriage means 3. During playing of the record, however, as well as during operations preparatory to playing of a record, the tone arm means 10 will carry out predetermined angular movements with respect to the central plane of the carriage means 3.

The determination of the positions of the carriage means 3 and tone arm means 10 is brought about by a yieldable positioning means which includes a stationary guide plate 21 situated in a plane normal to the axis of the tone arm means 10 when the latter is in its initial position. This positioning means includes in addition to the guide plate 21 a pair of symmetrical positioning levers 22 swingably carried by the plate 21 and having positioning jaws 22a ' and 22b' between which part of the rear portion 10b of the shaft of the tone arm means 10 is located, and also between which there is a motion-transmitting pin 23 which is fixed to and extends rearwardly from the carriage means 3. Both the pin 23 and the rear portion 10b of the tone arm means are of circular cross section. The positioning levers 22 have lower portions 22a and 22b supported for swinging movement on isolated pins 22a'' and 22b'' carried by the guide plate 21 at locations where they are equidistant from the central plane of symmetry of the rotary cam means 2, this latter plane extending centrally through the plate 21 and of course coinciding with the plane occupied by the record 19 during the playing thereof, as pointed out above. A spring 24 extends between and is connected to the levers 22 for urging them toward each other, and in order to determine the minimum distance between the levers the plate 21 carries a rearwardly extending stop member 25 which is centrally positioned with respect to the plane occupied by the record 19 during the playing thereof.

The stop member 25 is situated at the upper end of an opening 26 which is formed in and extends through the guide plate 21 and which is situated at the region of the jaws 22a' and 22b' of the positioning levers 22. This opening 26 is symmetrical with respect to the plane occupied by the record 19 during the playing thereof. The pin 23 and shaft portion 10b of the tone arm means both extend not only between the positioning levers 22 but also through the opening 26. The shaft portion 10b carries to the rear of the plate 21 a counterweight 10b'.

Figure 4:
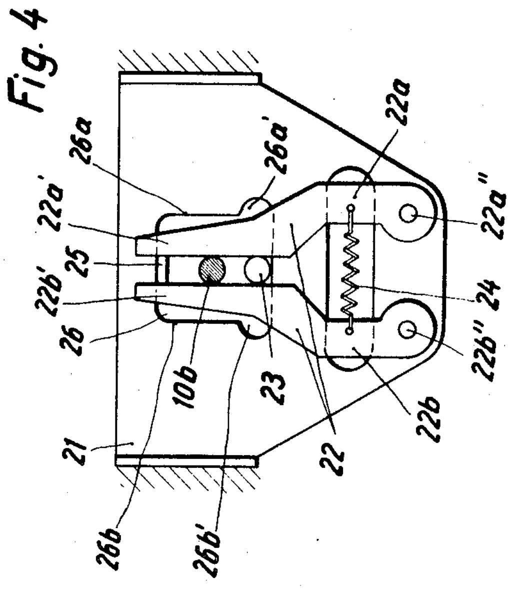
FIG. 4 shows in elevation a positioning means of the invention, the tone arm being shown in FIG. 4 in a transverse section in an initial starting position between record playing cycles.
Figure 3:
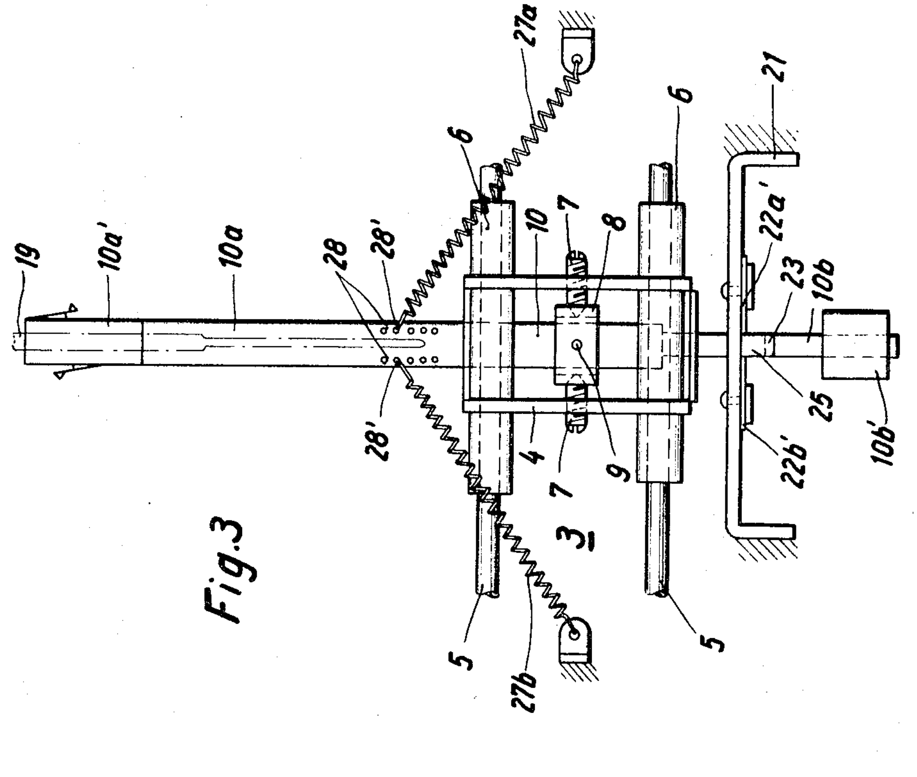
FIG. 3 is a schematic plan view of the tone arm control assembly of the invention as it appears in an initial position between record playing cycles.

In the initial position of the parts shown in FIGS. 3 and 4, between record-playing cycles, the carriage means 3 is centrally positioned with respect to the plane to be occupied by the record 19 during the playing thereof, and of course the axis of the tone arm means 10 is located in this latter plane, the rear portion 10b of the shaft of the tone arm means and the motion-transmitting pin 23 of the carriage means 3 being held by the force of the spring 24 between the jaws of the positioning levers 22 of the positioning means, the stop 25 at this time being engaged by the jaws of both positioning levers. The width of the stop 25, the diameter of the rear portion 10b of the shaft of the tone arm means, and the diameter of the pin 23 are all equal. Thus, it will be seen that with this arrangement not only the carriage means 3 but also the tone arm means 10 has, as a result of the yieldable positioning means, a stable central location when in their initial positions between record-playing cycles.

Upon rotary movement of the cam means 2, after one or the other sides of the record has been selected, the carriage means 3 will be shifted either in the direction C or in the direction D depending upon which of the camming end faces 2a, 2b of the rotary cam means coacts with the cam follower means 11, in accordance with the selection which has been made in the manner set forth above. The result of this shifting movement of the carriage means by way of the rotary cam means and cam follower means will cause the motion transmitting pin 23 to swing one or the other of the levers 22 away from the stop 25 in opposition to the spring 24. That one of the positioning levers 22 which is not displaced by the pin 23 will remain in engagement with the stop 25.

The tone arm means 10 is acted upon by a pair of springs 27a and 27b which form a spring means for locating one or the other of the needles of a double needle assembly 10a' in engagement with one or the other sides of the record 19, and during the lateral displacement of the carriage means 3 one or the other of the springs 27a or 27b will be tensioned. These springs 27a and 27b are connected on the one hand to stationary brackets and on the other hand to selected openings 28' formed in a spring attaching device 28 which is connected with and extends longitudinally along the tone arm means 10. This spring connecting assembly 28 is situated along the tone arm means 10 to the rear of the needle assemblies 10a'.

Figure 6:
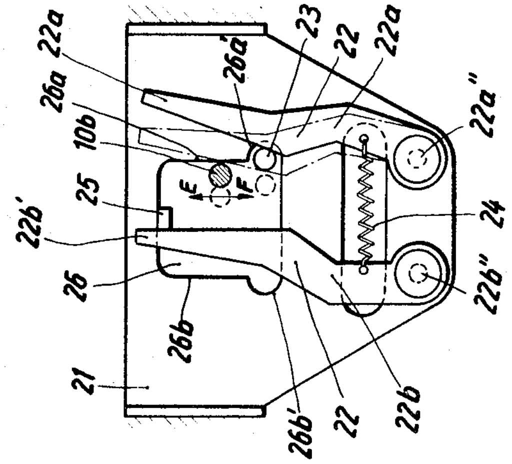
FIG. 6 shows the yieldable positioning means of FIG. 4 in a position which the parts take during introduction of a record-playing cycle.
Figure 5:
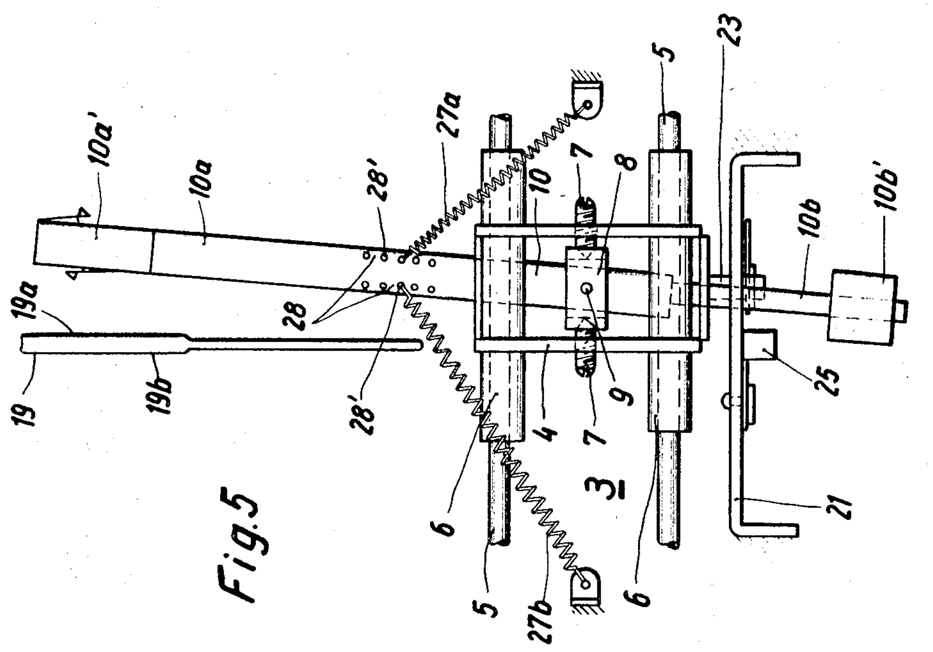
FIG. 5 is a schematic plan view illustrating the parts of FIG. 3 in a position they take during movement toward the record-playing position.

The result is that during lateral shifting of the carriage means 3 the rear portion 10b of the shaft of the tone arm will engage one or the other of the limiting side edges 26a or 26b of the opening 26. This operation is illustrated in FIGS. 5 and 6 for the case where the electromagnet 18 is maintained unenergized so that the cam follower means coacts with the right camming surface 2a of the rotary cam means 2. The cam follower means 11 is situated at this time at the highest part of the camming surface 2a which is situated most distant from the central plane of symmetry of the cam 2, so that the carriage means 3 has been shifted to its outermost right end position. At this time the follower pin 23 extends into a notch 26a' which extends to the right beyond the limiting edge 26a at the lower end of the opening 26.

Where the selection is made so as to displace the carriage means to the left, the cam follower means, when it engages the highest part of the camming surface 2b which is situated most distant from the plane of symmetry of the cam, will locate the follower pin 23 in the notch 26b' which extends to the left beyond the limiting edge 26b which coacts with the tone arm means. Thus, in the position of the parts shown in FIGS. 5 and 6, the right positioning lever 22 has been displaced to its fully open position, and at this time the tone arm means 10 engages at its rear shaft portion 10b the right limiting edge 26a of the opening 26, so that the spring 27b at this time is under the maximum tension and the double-needle assembly 10a' is situated at the greatest distance from the plane which is to be occupied by the record 19 during the playing thereof.

In this position of the parts the selected record 19 is displaced in a known way into engagement with the vertical turntable which engages only the central ungrooved portion of the record, so that the grooved opposed sides thereof are simultaneously exposed. The rotary cam means 2 continues to turn until the inwardly directed camming surface portion 2a'' comes into engagement with the cam follower means 11, and of course if the other side has been selected it will be the inwardly extending camming surface portion 2b'' which turns into engagement with the cam follower means 11 at this time. After the rotary cam means has turned from its initial position through 180°, the camming surface portion 2a'' will engage the cam follower means and the turning of the rotary cam means will be terminated automatically by the mechanism of the record changer.

As a result of the return movement of the cam follower means 11 toward its initial position until it engages the camming surface portion 2a'', the carriage means 3 also returns partially toward its initial position, with the result that the rearwardly directed portion 10b of the tone arm shaft only remains in engagement with the limiting edge 26*a* until the needle assembly 10*a* at the front end of the tone arm means has been placed by the spring 27*b* in engagement with the entrance groove of the right side of the record 19. During the last part of the inward movement of the camming surface portion 2*a''* toward the central plane of symmetry of the cam 2, the reverse movement of the carriage means 3 displaces the rear tone arm shaft portion 10*b* away from the limiting edge 26*a* so that the engagement of the tone arm means with the yieldable positioning means is completely interrupted, and thus when the rotary cam means stops after having turned through 180° from its initial position, the tone arm means 10 will only be displaced by the groove of the disc record 19 in the vertical plane EF, indicated by the double-headed arrow in FIG. 6, with the rear portion 10*b* of the tone arm shaft located at this time in the dotted line position of FIG. 6 through which the double-headed arrow EF extends.

When the needle assembly of the tone arm means reaches the innermost end groove of the record, the automatic record changing mechanism is again automatically started and the turning of the cam means 2 continues through the second 180° so that at this time the cam follower means 11 engages the second part of the camming surface 2*a* which is also situated at a maximum distance from the central plane of symmetry of the cam means, thus again situating the carriage means 3 in its rightmost end position with the tone arm 10 having its rear shaft portion 10*b* again engaging the limiting edge 26*a* of the opening 26. Thus, the tone arm means is displaced away from the disc record 19.

Upon return of the parts to their initial position where the cam follower means 11 is again situated at the entrance region 2*a'* of the camming surface 2*a*, the spring 24 of the yieldable positioning means acts on the lever 22, which has been displaced from the stop 25, to swing this lever back toward the stop, so that the motion-transmitting pin 23 acts on the carriage 3 to return the latter to its central initial position. Both of the positioning levers 22 will now engage the stop 25 causing the rear portion 10*b* of the tone arm means and the pin 23 to be again situated at the positions indicated in FIG. 4. Thus, not only the tone arm means 10 but also the carriage means 3 again find themselves in the initial position between record-playing cycles, this initial position being situated centrally between the operating positions which the parts take in connection with playing of the opposed sides of the record.

A particular advantage which is achieved by the invention resides in the fact that the disc-shaped cam means 2 is symmetrical with respect to its central plane of symmetry and also has at each end face a camming surface which is circumferentially symmetrical with respect to the position which the cam means takes after having turned through 180°. Thus, not only is the cam means symmetrical with respect to the central plane of symmetry which coincides with the plane occupied by the record 19 when the latter is being played, but in addition the circumferential end camming surfaces are each symmetrical with respect to a vertical plane which contains the axis of the cam shaft 1 and which passes downwardly through the rotary cam means when the latter is in its initial position indicated in FIG. 2. These camming surfaces at the opposed ends of the rotary cam means are so simple that the entire cam means can be very simply manufactured at low cost, without any machining, as by a die-casting or injection molding process. Furthermore, the reversing movement from one side to the other side of the record is reduced by half, as compared to conventional arrangements, so that the time required for this reversing movement is also halved, as compared to known record changers. In this way a record can be transported more rapidly from the magazine to the turntable. Also, the swinging of the tone arm means away from its initial position, then into engagement with the record, and then away from the record is brought about with an exceedingly simple and reliably operating structure.

Although the invention is illustrated and described with reference to one preferred embodiment thereof, it is to be expressly understood that it is in no way limited to the disclosure of such a preferred embodiment, but is capable of numerous modifications within the scope of the appended claims.

I claim:

1. In a record player for playing a selected side of a disc record which is adapted to rotate, during the playing thereof, in opposite directions around a horizontal axis and which is situated with its opposed sides in a vertical plane normal to said axis during playing of the record, tone arm means having a longitudinal axis for engaging a selected side of a record in said plane during playing of the selected side, bearing means supporting said tone arm means for swinging movement about a vertical axis as well as for swinging movement about a horizontal axis which is normal to said vertical axis and which is parallel to the axis of rotation of the disc record, carriage means carrying said bearing means and supporting the latter for movement parallel to its horizontal axis, yieldable positioning means comprising a stationary plate and a pair of positioning levers swingably mounted on said plate, said carriage means and said tone arm means extending between said positioning levers and being initially positioned by them, between record playing operations, at a location where the longitudinal axis of the tone arm means is located in the plane subsequently occupied by a disc record during the playing thereof, rotary cam means having a vertical central plane of symmetry coinciding with the plane occupied by the disc record during the playing thereof and having on opposite sides of said plane of symmetry configurations which are fully symmetrical with respect to each other, cam follower means carried by said carriage means for movement to one side or the other side of said central plane of symmetry of said cam means depending upon which side of the disc record is selected, and selecting means coacting with said cam follower means for situating the latter at a selected side of said plane of symmetry, said rotary cam means coacting with said cam follower means for displacing said carriage means in opposition to said yieldable positioning means in a direction along the horizontal axis of said bearing means which locates said tone arm means at a selected side of the plane occupied by a disc record during the playing thereof, and said rotary cam means then coacting with said carriage means for returning the latter part of the way toward said initial position thereof for placing said tone arm means in engagement with the selected side of the record.

2. The combination of claim 1 and wherein a spring means coacts with said tone arm means for urging the latter against the selected side of the disc record, said cam means coacting with said cam follower means for displacing said carriage means and tone arm means not only in opposition to said yieldable positioning means but also in opposition to said spring means.

3. The combination of claim 2 and wherein said yieldable position means coacts during the rotary movement of said cam means with said tone arm means for swinging the latter about said vertical axis of said bearing means with respect to said carriage means during movement of the latter parallel to the horizontal axis of said bearing means, and coacts with said carriage means, during its partial return towards said initial position, displacing said tone arm means to a location where it is completely out of engagement with said yieldable positioning means and is supported exclusively by said bearing means while engaging only the selected side of the record against which it is urged by said spring means.

4. The combination of claim 1 and wherein said selecting means includes a spring normally maintaining said cam follower means at one side of said plane of symmetry and electromagnetic means actuated by the operator for displacing said cam follower means in opposition to the latter spring to the other side of said plane of symmetry.

5. The combination of claim 1 and wherein said rotary cam means is of a substantially disc-shaped configuration and has symmetrical camming surfaces respectively situated at opposed end faces of said cam means which are equidistant from said plane of symmetry.

6. The combination of claim 5 and wherein said rotary cam means has an axially extended notched portion of sector-shaped configuration through which said cam follower means is freely movable to a selected side of said plane of symmetry, and said camming end faces initially being symmetrically inclined from said plane of symmetry at said sector-shaped notch and then extending circumferentially around said cam means and having a predetermined configuration with respect to said plane of symmetry for providing preselected movement of said carriage means.

7. The combination of claim 1 and wherein said carriage means includes a pair of parallel tubes slidable on a pair of stationary guide rods which are extending through said tubes, a substantially U-shaped support fixed to and extending between said tubes and having a pair of vertical sidewalls between which said bearing means is located with said tone arm means extending through the space between said sidewalls in a plane substantially parallel to said sidewalls when said tone arm means is in said initial position thereof, said sidewalls supporting a rod of said selecting means for axial movement, and said latter rod extending horizontally and carrying said cam follower means, said U-shaped support having distant from said tubes a horizontal wall connecting said sidewalls and formed with a slot through which said cam follower means extends to coact with said rotary cam means, and said rod of said selecting means being acted upon by a spring to situate said cam follower means on one side of said plane of symmetry, one of said sidewalls carrying an electromagnet, having an armature acting on said rod of said selecting means for displacing the latter in opposition to the spring to a location where said cam follower means is situated on the other side of said plane of symmetry.

8. The combination of claim 1 and wherein a pin fixed to and extending from said carriage means is operatively connected to said positioning means, said tone arm means having a tone arm shaft extending substantially parallel to said pin in the initial position of said carriage means and tone arm means and which is also operatively connected to said yieldable positioning means, said stationary plate of said yieldable positioning means being formed with an opening which receives said pin of said carriage means and said tone arm shaft, said pin of said carriage means and tone arm shaft extending between said pair of swingable positioning levers, a spring urging said levers toward each other, said plate of said positioning means having a central stop engaged by said levers, and the latter when engaging said stop positioning said carriage pin and tone arm shaft at said initial position, said cam means coacting with said cam follower means for displacing said carriage means and said pin thereof in opposition to one or the other of said positioning levers while said tone arm shaft coacts with one side of a pair of side edges of said opening of said plate of said positioning means.

9. The combination of claim 8 and wherein said side edges of said opening of said plate of said positioning means extend vertically while having notches extending beyond said side edges for receiving said pin of said carriage means so that said pin of said carriage means can move laterally to an extent greater than said tone arm shaft which is limited by said side edges.

10. The combination of claim 2 and wherein said tone arm means includes a double needle system for selectively coacting with a selected side of a disc record, and said spring means which acts on said tone arm means including a pair of springs respectively coacting with said tone arm means for urging the latter at said needle system thereof into engagement with a selected side of the record.